J. BABILLION.
Grain Drier.
No. 44,150.
Patented Sept. 13, 1864.
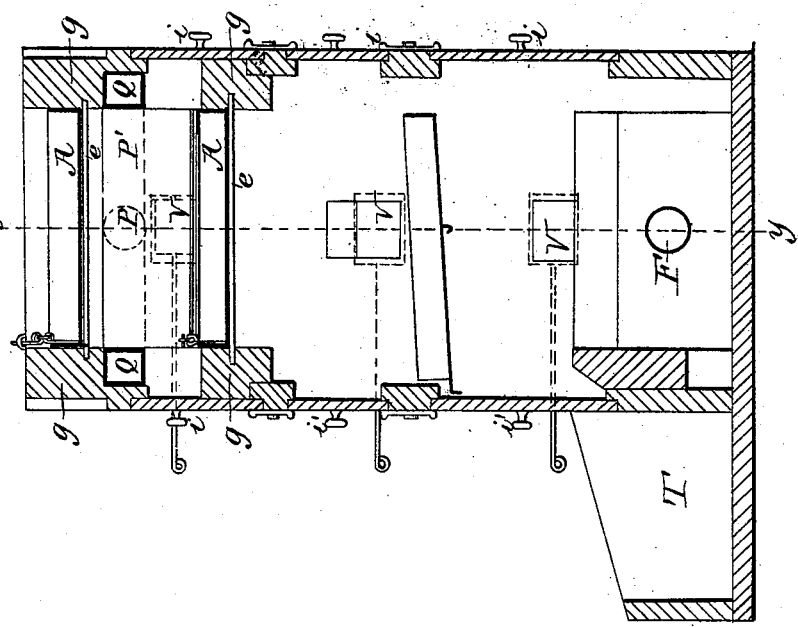
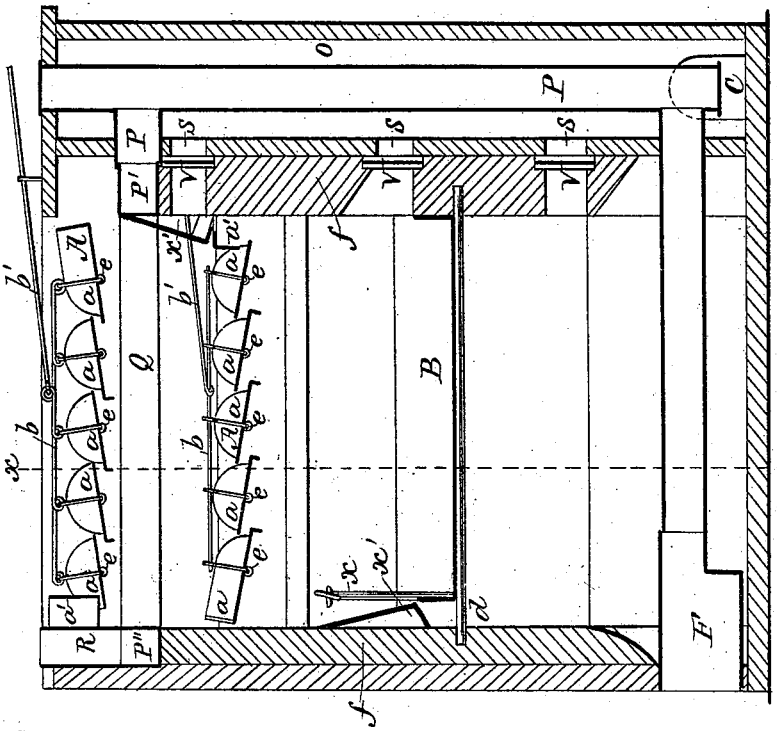

UNITED STATES PATENT OFFICE.

JOHN BABILLION, OF DETROIT, MICHIGAN.

IMPROVED GRAIN-DRIER.

Specification forming part of Letters Patent No. 44,150, dated September 13, 1864.

*To all whom it may concern:*

Be it known that I, JOHN BABILLION, of Detroit, in the county of Wayne and State of Michigan, have invented a new and useful Improvement in Grain-Driers; and I do hereby declare that the following is a full, clear, and exact description thereof, which will enable others skilled in the art to make and use the same, reference being had to the accompanying drawings, forming part of this specification, in which—

Figure 1 represents an elevation of a section of my grain-drier, taken on the line $y$ of Fig. 2; Fig. 2, an elevation of a section of the same, taken at right angles to the former section in the line $x$ of Fig. 1.

Similar letters of reference indicate like parts.

My invention consists of improvements in grain driers, part of which go to increase the efficiency of my grain drier patented March 3, 1863, and numbered 37,800. The casing of the grain-drier may be of any suitable material. Its lower division contains a furnace, F, the flue of which runs into a pipe, P, which ascends within an air-chamber, O, through the top of the casing, at which point it is closed by a removable cover. At a small distance below the upper drying-trays the pipe P branches inward, connecting with a horizontal pipe, P′, which communicates with the pipes Q, running along the front and also along the back of the casing, to the opposite end thereof, where they connect with a pipe, P″, which is intersected by the discharge-flue R at about the middle of that end of the casing. The air-chamber O is perforated under each tray A A and B by openings S, which are governed by sliding dampers V, whose rods extend through the front casing, as shown in Fig. 2. Air is supplied to the air-chamber through an opening, C, below.

A A represents two trays—one over the other—each made up of small trays or sections $a$, which are constructed of metallic leaves, with end pieces at right angles to the leaves, as seen in Fig. 1, to complete the trays on their sides. Strips of metal, $a'$, one of them bent to a right angle, extend from the front to the back side of the casing along the front face of the trays A, so as to form a siding to that end of each tray to retain the grain when the trays are in a horizontal position. Each leaf of the trays A is sustained upon a rod, $e$, secured in the sides $g$ of the casing, or in a separate frame set within it, upon which rods $e$ the sections $a$ turn as upon centers. A rod, $b$, connects with each leaf of the several trays A, and this is connected to a rod, $b'$, for each tray A, so as the operator can, by moving it, tilt the trays A to empty the upper one upon the one beneath, and that again upon the tray B, which is a tray made of one continuous floor with raised sides, except at the front of the casing. A rod (not shown in the drawings) fastened to one of its sides passes through the door $i''$ over the bin T, to enable the operator to tilt the tray B, which then empties itself (the door $i'$ being first removed) into the bin. The tray B revolves around the rod $d$, which sustains its weight, and whose ends pass into the ends $f$ of the casing. The bottoms or leaves of the sections $a$ of the upper trays may be perforated or not, as may be preferred. If they are not perforated, provision must be made for the free circulation of air through the interior of the drier. The metal strips $a$, which serve as ends to the trays A when these are in their normal position, serve also as channel-ways for the free passage of the air from below the lower sectional tray A to the top of the drier. Deflectors $x'$ are placed at such points as require them in order to guide the falling grain into the tray below. The leaves of the trays A must overlap enough to cause the weight of the grain to preponderate on that side of the leaf which is not overlapped, so that when the grain runs upon them the leaves will close upon each other automatically.

The operation of the drier is as follows: The damp or wet grain is first run upon the the upper tray A, and when nearly deprived of its moisture it is dumped upon the tray below, and a new charge run upon the tray A. When the grain upon the lower tray A is dumped upon the tray B, the upper tray is again dumped and a fresh charge is run upon it. Each tray is independent of the other, and the heat under each can be regulated independently by means of the dampers V. It will be seen that three charges of grain are under operation at the same time.

Stirrers or rakes of any suitable construction are to be used for stirring the grain constantly upon each tray or floor. They are to be driven by any convenient power. I have not shown the stirrers, because I make no claim for their use. The grain upon the two upper floors or trays may be treated with superheated steam instead of with hot air, and in practice this is to be preferred, leaving the grain on the lower floor, B, only to be acted upon by hot air. The pipes for the conveyance of the steam are to be conducted up within the flue O to the valve-passage S, which is to be in that case simply a collar to receive the steam-pipe, and the top of the drier is to be covered steam-tight with an escape-pipe and damper fixed in the cover instead of being left open, as shown in the drawings. These changes involve no departure from the principle of my invention, and can be made by any mechanic.

I claim as new and desire to secure by Letters Patent—

1. The hot-air chamber surrounding the flue of the furnace, and supplied with side passages, S, and valve V, in combination with the sectional trays A A, constructed and operating substantially as described.

2. Suspending each leaf of the trays A A upon separate rods e, on which they vibrate, substantially as described.

JOHN BABILLION.

Witnesses:
 EUGENE FECHT,
 JULIUS FECHT.